United States Patent
Annaamalai et al.

(10) Patent No.: US 6,445,715 B1
(45) Date of Patent: Sep. 3, 2002

(54) DYNAMIC TRUNK PROTOCOL

(75) Inventors: Alagu Annaamalai, Cupertino; Umesh Mahajan, Fremont, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/141,231

(22) Filed: Aug. 27, 1998

(51) Int. Cl.$^7$ .................................................. H04J 3/16

(52) U.S. Cl. ....................................... 370/466; 370/467

(58) Field of Search ................................ 370/469, 389, 370/466–467, 395.53, 395.2

(56) References Cited

U.S. PATENT DOCUMENTS

| | | | |
|---|---|---|---|
| 4,864,559 A | 9/1989 | Perlman | 370/60 |
| 5,018,137 A | 5/1991 | Backes et al. | 370/85.13 |
| 5,027,350 A | 6/1991 | Marshall | 370/85.13 |
| 5,088,032 A | 2/1992 | Bosack | 395/200 |
| 5,331,637 A | 7/1994 | Francis et al. | 370/54 |
| 5,353,283 A | 10/1994 | Tsuchiya | 370/60 |
| 5,361,256 A | 11/1994 | Doeringer et al. | 370/60 |
| 5,394,402 A | 2/1995 | Ross | 370/94.1 |
| 5,414,704 A | 5/1995 | Spinney | 370/60 |
| 5,442,633 A | 8/1995 | Perkins et al. | 370/94.1 |
| 5,500,860 A | 3/1996 | Perlman et al. | 370/85.13 |
| 5,511,168 A | 4/1996 | Perlman et al. | 395/200.15 |
| 5,583,996 A | 12/1996 | Tsuchiya | 395/200.15 |
| 5,600,644 A | 2/1997 | Chang et al. | 370/404 |
| 5,612,959 A | 3/1997 | Takase et al. | 370/390 |
| 5,617,421 A | 4/1997 | Chin et al. | 370/402 |
| 5,633,858 A | 5/1997 | Chang et al. | 370/255 |
| 5,633,866 A | 5/1997 | Callon | 370/397 |
| 5,684,800 A | 11/1997 | Dobbins et al. | 370/401 |
| 5,740,171 A | 4/1998 | Mazzola et al. | 370/392 |
| 5,742,604 A | 4/1998 | Edsall et al. | 370/401 |
| 5,764,636 A | 6/1998 | Edsall | 370/401 |
| 5,796,732 A | 8/1998 | Mazzola et al. | 370/351 |
| 5,796,740 A | 8/1998 | Perlman et al. | 370/401 |
| 5,818,842 A | 10/1998 | Burwell et al. | 370/397 |
| 5,828,844 A | 10/1998 | Civanlar et al. | 395/200.58 |
| 5,898,686 A | 4/1999 | Virgile | 370/381 |
| 5,909,441 A | 6/1999 | Alexander, Jr. et al. | 370/395 |
| 5,909,550 A | 6/1999 | Shankar et al. | 395/200.57 |
| 6,035,105 A * | 3/2000 | McCloghrie et al. | 395/200.66 |
| 6,285,659 B1 * | 9/2001 | Feuerstraeter et al. | 370/466 |

OTHER PUBLICATIONS

Gibson, The Communications Handbook, 1997, CRC Press, p. 538.*

Cisco Systems, Inc., "ISL Functional Specification", Copyright 1996, pp.1–4.

Cicso Systems, Inc. "Catalyst 5000 Software Release 2.1 Feature Set", 1996, pp. 1–9.

Cisco Systems, Inc., "Setting up VLANs Automatically" 1997, pp. 1–3.

Cisco Systems, Inc., "The VLAN Trunk Protocol", Copyright 1996, pp. 1–2.

3Com Corporation, "3 COM Transcend VLANs", Apr. 22, 1997, pp. 1–15.

IEEE, "Draft Standard for Virtual Bridged Local Area Networks" Feb., 1997, pp. 1–88.

(List continued on next page.)

Primary Examiner—Melvin Marcelo
Assistant Examiner—Ron Abelson
(74) Attorney, Agent, or Firm—Cesari and McKenna, LLP

(57) ABSTRACT

A dynamic trunk protocol enables dynamic negotiation of trunk encapsulation types between ports connecting intermediate stations in a computer network. The stations are preferably interconnected by a point-to-point link. Negotiation between a local port and a neighbor port of the switches results in synchronization of the port configurations to a common trunk encapsulation type, such as an Interswitch Link (ISL), IEEE 802.1Q or non-trunk port configuration.

37 Claims, 18 Drawing Sheets

OTHER PUBLICATIONS

IEEE, "Draft Standard P802.1Q/D10 IEEE Standards for Local and Metripolitan Area Networks: Virtual Bridged Local Area Networks", Copyright 1997, pp. 1–211.

Cisco Systems, Inc., "ISL Configurations for Cisco IOS and the Catalyst 5000", Copyright 1996, pp. 1–8.

Release Note, "2.2(1) Version Software Configuration Note Catalyst 3000 Series", pp. 1–6.

Cisco Systems, Inc., "Catalyst 2820 Series and Catalyst 1900 Series Enterprise Edition Software Configuration Guide", Nov. 21, 1997, pp. 2–1 to 2–49.

Cisco Systems, Inc., "Catalyst 5000 Series Software Configuration Guide", Feb. 27, 1998, pp. 13–1 to 13–24.

*Cisco Catalyst Workgroup Switch Version* 3.0, web, http://www.cisco.com/warp/public/558/16.html, pp. 1–5.

Cisco VLAN Roadmap, web, http://www.cisco.com/warp/public/538/7.html, pp. 1–9.

*IAC* (*SM*) *Newsletter Database* (*TM*) *Communications Industry Researchers, Broadband Networks and Applications*, copyright 1995 Information Access Company, a Thomson Corporation Company, Section No. 16, vol. E; ISSN: 1059–0544, Headline, *Cisco Announces New Fast Ethernet Interface*, pp. 2–3.

*IAC* (*SM*) *Newsletter Database* (*TM*) (*Communications Industry Researchers, Broadband Networks and Applications*, copyright 1995 Information Access Company, a Thomson Corporation Company, Section No. 16, vol. 3; ISSN: 1059–0544, Headline, *Cisco Announces Token–Ring Switching Products*, pp. 4–5.

*Cisco 7000 Series Gains Fast Ethernet Interface, Becomes Only Router Family to Support Three High–Speed Network Types*,web, http://www.cisco.com/warp.public/146/199.html pp. 1–2.

* cited by examiner

| | | 1 | 2 | 3 | 4 | 5 | 6 | 7 | 8 | 9 |
|---|---|---|---|---|---|---|---|---|---|---|
| | | OFF ISL/IQ | ON ISL | DSR ISL | AUTO ISL | ON IQ | DSR IQ | AUTO IQ | DSR NEGO | AUTO NEGO |
| NEIGHBOR PORT'S CONFIGURATION (Nc) (ADMIN STATUS AND ADMIN ENCAPSULATION TYPE) | | LOCAL PORT'S CONFIGURATION (Lc) (ADMIN STATUS AND ADMIN ENCAPSULATION TYPE) | | | | | | | | |
| 1 | OFF, ISL/IQ | Lc=NT Nc=NT | Lc=NT Nc=T,ISL | Lc=NT Nc=NT | Lc=NT Nc=NT | Lc=NT Nc=T,IQ | Lc=NT Nc=NT | Lc=NT Nc=NT | Lc=NT Nc=NT | Lc=NT Nc=NT |
| 2 | ON, ISL | Lc=T,ISL Nc=NT | Lc=T,ISL Nc=T,ISL | Lc=T,ISL Nc=T,ISL | Lc=T,ISL Nc=T,ISL | Lc=T,IQ Nc=T,ISL | Lc=NT Nc=T,ISL | Lc=NT Nc=T,ISL | Lc=T,ISL Nc=T,ISL | Lc=T,ISL Nc=T,ISL |
| 3 | DSR, ISL | Lc=NT Nc=NT | Lc=T,ISL Nc=T,ISL | Lc=T,ISL Nc=T,ISL | Lc=T,ISL Nc=T,ISL | Lc=T,IQ Nc=NT | Lc=NT Nc=T,ISL | Lc=NT Nc=T,ISL | Lc=T,ISL Nc=T,ISL | Lc=T,ISL Nc=T,ISL |
| 4 | AUTO, ISL | Lc=NT Nc=NT | Lc=T,ISL Nc=T,ISL | Lc=T,ISL Nc=T,ISL | Lc=NT Nc=NT | Lc=T,IQ Nc=NT | Lc=NT Nc=NT | Lc=NT Nc=NT | Lc=T,ISL Nc=T,ISL | Lc=T,ISL Nc=T,ISL |
| 5 | ON, IQ | Lc=NT Nc=T,IQ | Lc=T,ISL Nc=T,IQ | Lc=T,ISL Nc=T,ISL | Lc=NT Nc=NT | Lc=T,IQ Nc=T,IQ | Lc=T,IQ Nc=T,IQ | Lc=T,IQ Nc=T,IQ | Lc=T,IQ Nc=T,IQ | Lc=T,IQ Nc=T,IQ |
| 6 | DSR, IQ | Lc=NT Nc=NT | Lc=T,ISL Nc=NT | Lc=T,ISL Nc=T,ISL | Lc=NT Nc=NT | Lc=T,IQ Nc=T,IQ | Lc=T,IQ Nc=T,IQ | Lc=T,IQ Nc=T,IQ | Lc=T,IQ Nc=T,IQ | Lc=T,IQ Nc=T,IQ |
| 7 | AUTO, IQ | Lc=NT Nc=NT | Lc=T,ISL Nc=NT | Lc=T,ISL Nc=T,ISL | Lc=NT Nc=NT | Lc=T,IQ Nc=T,IQ | Lc=T,IQ Nc=T,IQ | Lc=NT Nc=NT | Lc=T,IQ Nc=T,IQ | Lc=T,IQ Nc=T,IQ |
| 8 | DSR, NEGO | Lc=NT Nc=NT | Lc=T,ISL Nc=T,ISL | Lc=T,ISL Nc=T,ISL | Lc=T,ISL Nc=T,ISL | Lc=T,IQ Nc=T,IQ | Lc=T,IQ Nc=T,IQ | Lc=T,IQ Nc=T,IQ | Lc=T,ISL Nc=T,ISL | Lc=T,ISL Nc=T,ISL |
| 9 | AUTO, NEGO | Lc=NT Nc=NT | Lc=T,ISL Nc=T,ISL | Lc=T,ISL Nc=T,ISL | Lc=NT Nc=NT | Lc=T,IQ Nc=T,IQ | Lc=T,IQ Nc=T,IQ | Lc=NT Nc=NT | Lc=T,ISL Nc=T,ISL | Lc=NT Nc=NT |

TABLE 1

FIG. 5

| EVENTS | CURRENT PORT STATE | | | | | |
|---|---|---|---|---|---|---|
| | S1 OFF | S2 ACCESS | S3 NT-DTP | S4 ACCESS-M | S5 T-DTP | S6 TRUNK |
| E1 | ERROR | A1, S1 | A1, S1 | A1, S1 | A1, S1 | A1, S1 |
| E2 | A2, S3 | A4, S3 | A0, S3 | A14, S3 | A2, S5 | A20, S5 |
| E3 | A3, S2 | A0, S2 | A2, S3 | A17, S2 | A0, S5 | A5, S5 |
| E4 | ERROR | A0, S2 | A0, S3 | A0, S4 | A0, S5 | A16, S6 |
| E4' | A0, S1 | A21, S2 | A0, S3 | A0, S4 | A0, S5 | A22, S6 |
| E5 | ERROR | A15, S4 | A7, S4 | A15, S4 | A13, S4 | A10, S4 |
| E6a | ERROR | ERROR | A6, S2 | ERROR | A12, S2 | ERROR |
| E6b | ERROR | ERROR | A8, S6 | ERROR | A11, S6 | ERROR |
| E7 | ERROR | ERROR | ERROR | ERROR | ERROR | A9, S2 |
| E8 | ERROR | ERROR | ERROR | A17, S2 | ERROR | ERROR |
| E9 | A18, S6 | A18, S6 | A18, S6 | A18, S6 | A18, S6 | A19, S6 |
| E10 | A0, S1 | ERROR | ERROR | ERROR | ERROR | A20, S5 |
| E11 | ERROR | A23, S2 | A23, S3 | A23, S4 | A23, S5 | A23, S6 |
| E12 | ERROR | ERROR | ERROR | ERROR | ERROR | A24, S3 |

TABLE 2

*FIG. 7*

| DTP PORT STATE | NAME | DESCRIPTION |
|---|---|---|
| S1 | OFF | PHYSICAL PORT IS NOT IN OPERATIONAL STATE. NO PACKET IS RECEIVED OR TRANSMITTED. |
| S2 | ACCESS | PORT PIC IS IN NON-TRUNK MODE AND IN STP. ONLY ONE NEIGHBOR IS DETECTED ON THIS PORT. $T_H$ (WITH PERIODIC INTERVAL) IS RUNNING.<br><br>TOS=NT (REPRESENTS PIC SETTING), TOT=N.A. PIC CONFIGURATION = NON-TRUNK. |
| S3 | NT-DTP | PORT IS IN DTP NEGOTIATION PHASE (PIC IS IN NON-TRUNK MODE). PORT IS NOT IN STP AND IS BLOCKED FOR TRANSMISSION AND RECEPTION OF DATA PACKETS. ONLY ONE NEIGHBOR IS DETECTED ON THIS PORT. $T_N$ HAS NOT EXPIRED. $T_H$ (WITH NEGOTIATION INTERVAL) IS RUNNING.<br><br>TOS = NEGOTIATED TRUNK STATUS (MAY REPRESENT PIC SETTING), TOT = NEGOTIATED ENCAPSULATED TYPE. PIC CONFIGURATION = NON-TRUNK. |
| S4 | ACCESS-M | PORT PIC IS IN NON-TRUNK MODE AND IN STP. THE PORT MAY BE RECEIVING DTP PACKETS FROM MULTIPLE NEIGHBORS, BUT WILL NOT RESPOND TO DTP PACKETS RECEIVED. $T_H$ (WITH PERIODIC INTERVAL) IS RUNNING. $T_M$ MAY BE RUNNING.<br><br>TOS=NT (REPRESENTS PIC SETTING), TAS=AUTO, TOT=N.A. PIC CONFIGURATION = NON-TRUNK.<br><br>TAS NEEDS TO BE SET TO "AUTO" IF IT IS CONFIGURED EARLIER TO "DESIRABLE" TO PREVENT THE NEIGHBOR PORTS FROM BECOMING TRUNK |
| S5 | T-DTP | PORT PIC IS IN ISL/802.IQ TRUNK MODE. PORT IS NOT IN STP AND IS BLOCKED FOR TRANSMISSION AND RECEPTION OF DATA PACKETS. ONLY ONE NEIGHBOR IS DETECTED ON THIS PORT. $T_N$ HAS NOT EXPIRED. $T_H$ (WITH NEGOTIATION INTERVAL) IS RUNNING.<br><br>TOS = NEGOTIATED TRUNK STATUS (MAY REPRESENT PIC SETTING), TOT = NEGOTIATED ENCAPSULATED TYPE. PIC CONFIGURATION = TRUNK. |
| S6 | TRUNK | PORT PIC IS IN ISL/802.IQ TRUNK MODE AND IS IN STP. ONLY ONE NEIGHBOR IS DETECTED ON THIS PORT. $T_H$ (WITH PERIODIC INTERVAL) IS RUNNING. $T_A$ MAY BE RUNNING DEPENDING ON LOCAL CONFIGURATION<br><br>TOS=T (REPRESENTS PIC SETTING),. TOT=ISL/IQ, PIC CONFIGURATION = TRUNK. |

TABLE 3

*FIG. 8*

| EVENT | DESCRIPTION |
|---|---|
| E1 | PORT LINK IS DOWN. |
| E2 | CHANGE IN LOCAL CONFIGURATION (LINK UP AND/OR CLI/SNMP CHANGES) OR A RECEIPT OF DTP PACKET THAT MAY MAKE THE PORT TO A TRUNK PORT OR A DIFFERENT TRUNK TYPE. |
| E3 | CHANGE IN LOCAL CONFIGURATION (LINK UP AND/OR CLI/SNMP CHANGES) OR RECEIPT OF A DTP PACKET THAT WILL MAKE THE PORT TO A NON-TRUNK PORT. |
| E4 | RECEIPT OF A DTP PACKET THAT WILL MAKE NO CHANGE IN THE CURRENT TRUNK STATE OF THE PORT. |
| E4' | CHANGE IN LOCAL CONFIGURATION (CLI/SNMP CHANGES) THAT WILL MAKE NO CHANGE IN THE CURRENT TRUNK STATE OF THE PORT. |
| E5 | SECOND NEIGHBOR DETECTED AND THE TRUNK ADMIN STATUS IS "AUTO/DESIRABLE". |
| E6a | DERIVED TOS=NT AND $T_N$ (NEGOTIATION TIMER) EXPIRED. |
| E6b | DERIVED TOS=T AND $T_N$ (NEGOTIATION TIMER) EXPIRED. |
| E7 | $T_A$ (ACCESS TIMER) EXPIRED. |
| E8 | $T_M$ (MULTIPLE NEIGHBOR TIMER) EXPIRED. |
| E9 | CHANGE IN LOCAL CONFIGURATION TO ONNONEGOTIATE OR LINK UP AND CONFIGURATION IS ONNONEGOTIATE. |
| E10 | CHANGE IN LOCAL CONFIGURATION FROM ONNONEGOTIATE TO ANY OTHER ADMIN STATUS. |
| E11 | $T_H$ (HELLO TIMER) EXPIRED. |
| E12 | RECEIPT OF A SYNC PACKET THAT WILL CAUSE A TRUNKING PORT TO SWITCH TO NT AND START NEGOTIATION. |

TABLE 4

*FIG. 9*

| ACTION | DESCRIPTION |
|---|---|
| A0 | NO OPERATION. |
| A1 | CLEAR ALL TIMERS. IF THE PORT IS TRUNKING, SWITCH THE PORT TO NON-TRUNKING. REMOVE PORT FROM STP. CLEAR DTP VARIABLES. |
| A2 | SEND DTP PACKET WITH DERIVED VALUES FOR TOS AND TOT. START/RESTART $T_N$. START/RESTART $T_H$ WITH NEGOTIATION INTERVAL. |
| A3 | ADD PORT TO STP ON NATIVE VLAN. RESTART $T_H$ WITH PERIODIC INTERVAL. |
| A4 | DELETE PORT FROM STP ON NATIVE VLAN. SEND DTP PACKET WITH DERIVED VALUES FOR TOS AND TOT. START $T_N$. RESTART $T_H$ WITH NEGOTIATION INTERVAL. |
| A5 | CLEAR $T_A$. DELETE PORT FROM STP ON ALL ACTIVE VLANS FOR THIS PORT. SEND DTP PACKET WITH DERIVED VALUES FOR TOS AND TOT. RESTART $T_H$ WITH NEGOTIATION INTERVAL. |
| A6 | CLEAR $T_N$. ADD PORT TO STP ON NATIVE VLAN. RESTART $T_H$ WITH PERIODIC INTERVAL. |
| A7 | CLEAR $T_N$. ADD PORT TO STP ON NATIVE VLAN. START $T_M$. RESTART $T_H$ WITH PERIODIC INTERVAL. |
| A8 | CLEAR $T_N$. CONFIGURE PIC TO NEGOTIATED TRUNK TYPE AND ADD PORT TO STP ON ALL ACTIVE VLANS ALLOWED. IF TRUNK MODE IS "AUTO/DESIRABLE". START $T_A$. RESTART $T_H$ WITH PERIODIC INTERVAL. |
| A9 | CLEAR $T_A$. DELETE PORT FROM STP ON ALL ACTIVE VLANS. CONFIGURE PIC TO NON-TRUNK. ADD PORT TO STP ON NATIVE VLAN. RESTART $T_H$ WITH PERIODIC INTERVAL. |
| A10 | CLEAR $T_A$. DELETE PORT FROM STP ON ALL ACTIVE VLANS. CONFIGURE PIC TO NON-TRUNK. ADD PORT TO STP ON NATIVE VLAN. START $T_M$. RESTART $T_H$ WITH PERIODIC INTERVAL. |
| A11 | CLEAR $T_N$. ADD PORT TO STP ON ALL ACTIVE VLANS. START $T_A$, IF TRUNK MODE IS "AUTO/DESIRABLE". RESTART $T_H$ WITH PERIODIC INTERVAL. |
| A12 | CLEAR $T_N$. CONFIGURE PIC TO NON-TRUNK. ADD PORT TO STP ON NATIVE VLAN. CLEAR $T_H$. START $T_H$ WITH PERIODIC INTERVAL. |
| A13 | CLEAR $T_N$. CONFIGURE PIC TO NON-TRUNK. ADD PORT TO STP ON NATIVE VLAN. START $T_M$. RESTART $T_H$ WITH PERIODIC INTERVAL. |

TABLE 5

FIG. 10A

| ACTION | DESCRIPTION |
|---|---|
| A14 | CLEAR $T_M$. DELETE PORT FROM STP ON NATIVE VLAN. SEND DTP PACKET WITH DERIVED VALUES FOR TOS AND TOT. START $T_N$. RESTART $T_H$ WITH NEGOTIATION INTERVAL. |
| A15 | START/RESTART $T_M$. |
| A16 | IF TRUNK MODE IS "AUTO/DESIRABLE", START/RESTART $T_A$. |
| A17 | CLEAR $T_M$. |
| A18 | CLEAR ALL TIMERS. IF THE PORT IS NON-TRUNKING, CONFIGURE PIC TO TRUNKING (ISL/802.IQ) AND ADD PORT TO STP ON ALL ACTIVE VLANS ALLOWED FOR THIS PORT. |
| A19 | CLEAR ALL TIMERS. CONFIGURE THE SPECIFIED ENCAPSULATION TYPE ON THE TRUNK. |
| A20 | CLEAR $T_A$. DELETE PORT FROM STP ON ALL ACTIVE VLANS FOR THIS PORT. SEND DTP PACKET WITH DERIVED VALUES FOR TOS AND TOT. START $T_N$. RESTART $T_H$ WITH NEGOTIATION INTERVAL. |
| A21 | RESTART $T_H$ WITH PERIODIC INTERVAL. |
| A22 | SEND A DTP PACKET. IF TRUNK MODE IS "AUTO/DESIRABLE", RESTART $T_A$ ELSE CLEAR $T_A$. |
| A23 | SEND A DTP PACKET. |
| A24 | CLEAR $T_A$. DELETE PORT FROM STP ON ALL ACTIVE VLANS FOR THIS PORT. CONFIGURE PIC TO NON-TRUNK. SET DERIVED TOS=NT FOR MODES DSR AND AUTO AND T FOR MODE ON. START $T_N$. RESTART $T_H$ WITH NEGOTIATION INTERVAL. |
| ERROR | REPORT ERROR. |

TABLE 5

*FIG. 10B*

| CONFIGURATION RECEIVED FROM NEIGHBOR PORT $N_{TOS}, N_{TAS}, N_{TOT}, N_{TAT}$ | CURRENT CONFIGURATION $L_{TOS} = NT, L_{TOT} = X$ | | | | | | |
|---|---|---|---|---|---|---|---|
| | $L_{TAS}, L_{TAT}$ | | | | | | |
| | 1 | 2 | 3 | 4 | 5 | 6 | 7 |
| | ON ISL | DSR ISL | AUTO ISL | DSR IQ | AUTO IQ | DSR NEGO | AUTO NEGO |
| 1 NT, ON, X, ISL | T, ISL | T, ISL | T, ISL | • | • | T, ISL | T, ISL |
| 2 NT, DSR, X, ISL | T, ISL | T, ISL | T, ISL | • | • | T, ISL | T, ISL |
| 3 NT, AUTO, X, ISL* | • | • | • | • | • | • | • |
| 4 NT, OFF, X, X | • | • | • | • | • | • | • |
| 5 NT, ON, X, IQ | T, ISL | • | • | T, IQ | T, IQ | T, IQ | T, IQ |
| 6 NT, DSR, X, IQ | T, ISL | • | • | T, IQ | T, IQ | T, IQ | T, IQ |
| 7 NT, AUTO, X, IQ* | • | • | • | • | • | • | • |
| 8 NT, DSR, X, NEGO | T, ISL | T, ISL | T, ISL | T, IQ | T, IQ | T, ISL | T, ISL |
| 9 NT, AUTO, X, NEGO* | • | • | • | • | • | • | • |
| 10 T, ON, ISL, ISL | T, ISL | T, ISL | T, ISL | • | • | T, ISL | T, ISL |
| 11 T, DSR, ISL, ISL | T, ISL | T, ISL | T, ISL | • | • | T, ISL | T, ISL |
| 12 T, AUTO, ISL, ISL | T, ISL | T, ISL | • | • | • | T, ISL | • |
| 13 T, OFF, ISL/IQ, X | T, ISL | • | • | • | • | • | • |
| 14 T, ON, IQ, IQ | T, ISL | • | • | T, IQ | T, IQ | T, IQ | T, IQ |
| 15 T, DSR, IQ, IQ | T, ISL | • | • | T, IQ | T, IQ | T, IQ | T, IQ |
| 16 T, AUTO, IQ, IQ | T, ISL | • | • | T, IQ | • | T, IQ | • |
| 17 T, DSR, X, NEGO | T, ISL | T, ISL | T, ISL | T, IQ | T, IQ | T, ISL | T, ISL |
| 18 T, AUTO, X, NEGO | T, ISL | T, ISL | • | T, IQ | • | T, ISL | • |

TABLE 6

FIG. 14

| CONFIGURATION RECEIVED FROM NEIGHBOR PORT $N_{TOS}$, $N_{TAS}$, $N_{TOT}$, $N_{TAT}$ | | CURRENT CONFIGURATION $L_{TOS} = T$ $L_{TAS}$, $L_{TOT}$, $L_{TAT}$ | | | | | | | | | | |
|---|---|---|---|---|---|---|---|---|---|---|---|---|
| | | OFF X X | ON ISL ISL | DSR ISL ISL | AUTO ISL ISL | ON IQ IQ | DSR IQ IQ | AUTO IQ IQ | DSR ISL NEGO | AUTO ISL NEGO | DSR IQ NEGO | AUTO IQ NEGO |
| | | 1 | 2 | 3 | 4 | 5 | 6 | 7 | 8 | 9 | 10 | 11 |
| 1 | NT, ON, X, ISL | NT, X | • | • | • | • | NT, IQ | NT, IQ | • | • | T, ISL | T, ISL |
| 2 | NT, DSR, X, ISL | NT, X | •* | •* | •* | • | NT, IQ | NT, IQ | •* | •* | T, ISL | T, ISL |
| 3 | NT, AUTO, X, ISL | NT, X | •* | •* | NT, ISL | • | NT, IQ | NT, IQ | •* | NT, ISL | T, ISL | NT, IQ |
| 4 | NT, OFF, X, X | NT, X | • | NT, ISL | NT, ISL | • | NT, IQ | NT, IQ | NT, ISL | NT, ISL | NT, IQ | NT, IQ |
| 5 | NT, ON, X, IQ | NT, X | • | NT, ISL | NT, ISL | • | • | • | T, IQ | T, IQ | • | • |
| 6 | NT, DSR, X, IQ | NT, X | • | NT, ISL | NT, ISL | • | • | • | T, IQ | T, IQ | • | • |
| 7 | NT, AUTO, X, IQ | NT, X | • | NT, ISL | NT, ISL | • | • | NT, IQ | T, IQ | NT, ISL | • | NT, IQ |
| 8 | NT, DSR, X, NEGO | NT, X | •* | •* | •* | • | • | • | •* | •* | T, ISL* | T, ISL* |
| 9 | NT, AUTO, X, NEGO | NT, X | •* | •* | NT, ISL | • | • | NT, IQ | •* | NT, ISL | T, ISL* | NT, IQ |
| 10 | T, ON, ISL, ISL | NT, X | • | • | • | • | NT, IQ | NT, IQ | • | • | T, ISL | T, ISL |
| 11 | T, DSR, ISL, ISL | NT, X | • | • | • | • | NT, IQ | NT, IQ | • | • | T, ISL | T, ISL |
| 12 | T, AUTO, ISL, ISL | NT, X | • | • | NT, ISL | • | NT, IQ | NT, IQ | • | NT, ISL | T, ISL | NT, IQ |
| 13 | T, OFF, X, X | NT, X | • | NT, ISL | NT, ISL | • | NT, IQ | NT, IQ | NT, ISL | NT, ISL | NT, IQ | NT, IQ |
| 14 | T, ON, IQ, IQ | NT, X | • | NT, ISL | NT, ISL | • | • | • | T, IQ | T, IQ | • | • |
| 15 | T, DSR, IQ, IQ | NT, X | • | NT, ISL | NT, ISL | • | • | • | T, IQ | T, IQ | • | • |
| 16 | T, AUTO, IQ, IQ | NT, X | • | NT, ISL | NT, ISL | • | • | NT, IQ | T, IQ | NT, ISL | • | NT, IQ |
| 17 | T, DSR, X, NEGO | NT, X | • | • | • | • | • | • | • | • | T, ISL* | T, ISL* |
| 18 | T, AUTO, X, NEGO | NT, X | • | • | NT, ISL | • | • | NT, IQ | • | NT, ISL | T, ISL* | NT, IQ |

TABLE 7

FIG. 15

| NEW CONFIGURATION $N_{TAS}, N_{TAT}$ | | CURRENT CONFIGURATION $L_{TOS} = NT$ | | | | | | | | | | |
|---|---|---|---|---|---|---|---|---|---|---|---|---|
| | | $L_{TAS}, L_{TOT}, L_{TAT}$ | | | | | | | | | | |
| | | 1 | 2 | 3 | 4 | 5 | 6 | 7 | 8 | 9 | 10 | 11 |
| | | OFF X X | ON ISL ISL | DSR ISL ISL | AUTO ISL ISL | ON IQ IQ | DSR IQ IQ | AUTO IQ IQ | DSR ISL NEGO | AUTO ISL NEGO | DSR IQ NEGO | AUTO IQ NEGO |
| 1 | ON, ISL | T, ISL | • | T, ISL | T, ISL | T, ISL | T, ISL | T, ISL | T, ISL | T, ISL | T, ISL | T, ISL |
| 2 | ON, IQ | T, IQ | T, IQ | T, IQ | T, IQ | • | T, IQ | T, IQ | T, IQ | T, IQ | T, IQ | T, IQ |
| 3 | OFF, X | • | • | • | • | • | • | • | • | • | • | • |
| 4 | DSR, ISL | NT, X | NT, X | • | NT, X | NT, X | NT, X | NT, X | • | NT, X | NT, X | NT, X |
| 5 | DSR, IQ | NT, X | NT, X | NT, X | NT, X | NT, X | • | NT, X | NT, X | NT, X | • | NT, X |
| 6 | DSR, NEGO | NT, X | NT, X | NT, X | NT, X | NT, X | NT, X | NT, X | • | NT, X | • | NT, X |
| 7 | AUTO, ISL | • | • | • | • | • | • | • | • | • | • | • |
| 8 | AUTO, IQ | • | • | • | • | • | • | • | • | • | • | • |
| 9 | AUTO, NEGO | • | • | • | • | • | • | • | • | • | • | • |

TABLE 8

*FIG. 16*

| NEW CONFIGURATION $N_{TAS}, N_{TAT}$ | | CURRENT CONFIGURATION $L_{TOS} = T$ | | | | | | | | | | |
|---|---|---|---|---|---|---|---|---|---|---|---|---|
| | | $L_{TAS}, L_{TOT}, L_{TAT}$ | | | | | | | | | | |
| | | 1 | 2 | 3 | 4 | 5 | 6 | 7 | 8 | 9 | 10 | 11 |
| | | OFF X X | ON ISL ISL | DSR ISL ISL | AUTO ISL ISL | ON IQ IQ | DSR IQ IQ | AUTO IQ IQ | DSR ISL NEGO | AUTO ISL NEGO | DSR IQ NEGO | AUTO IQ NEGO |
| 1 | ON, ISL | NA | • | • | • | T, ISL | T, ISL | T, ISL | • | • | T, ISL | T, ISL |
| 2 | ON, IQ | NA | T, IQ | T, IQ | T, IQ | • | • | • | T, IQ | T, IQ | • | • |
| 3 | OFF, X | NA | NT, X | NT, X | NT, X | NT, X | NT, X | NT, X | NT, X | NT, X | NT, X | NT, X |
| 4 | DSR, ISL | NA | • | • | • | NT, ISL | NT, ISL | NT, ISL | • | • | NT, ISL | NT, ISL |
| 5 | DSR, IQ | NA | NT, IQ | NT, IQ | NT, IQ | • | • | • | NT, IQ | NT, IQ | • | • |
| 6 | DSR, NEGO | NA | • | • | • | NT, ISL | NT, ISL | NT, ISL | • | • | NT, ISL | NT, ISL |
| 7 | AUTO, ISL | NA | • | • | • | NT, ISL | NT, ISL | NT, ISL | • | • | NT, ISL | NT, ISL |
| 8 | AUTO, IQ | NA | NT, IQ | NT, IQ | NT, IQ | • | • | • | NT, IQ | NT, IQ | • | • |
| 9 | AUTO, NEGO | NA | • | • | • | NT, ISL | NT, ISL | NT, ISL | • | • | NT, ISL | NT, ISL |

TABLE 9

*FIG. 17*

DYNAMIC TRUNK PROTOCOL

FIELD OF THE INVENTION

This invention relates to network switches and, more specifically, to a technique for efficiently interconnecting switches in a data communications network.

BACKGROUND OF THE INVENTION

Data communication in a computer network involves the exchange of data between two or more entities interconnected by communication links, segments and subnetworks. These entities are typically software programs executing on hardware computer platforms, such as end stations and intermediate stations. An example of an intermediate station may be a switch or router which interconnects the communication links and subnetworks to enable transmission of data between the end stations.

Communication software executing on the end stations correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an underlying architecture.

Modem communications network architectures are typically organized as a series of hardware and software levels or "layers" within each station. These layers interact to format data for transfer between, e.g., a source station and a destination station communicating over the network. Predetermined services are performed on the data as it passes through each layer and the layers communicate with each other by means of the predefined protocols. An example of such a communications architecture is the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower network interface layer 120 accepts industry standards defining a flexible network architecture oriented to the implementation of LANs.

Specifically, the network interface layer 120 comprises physical and data link sublayers. The physical layer 126 is concerned with the actual transmission of signals across the communication channel and defines the types of cabling, plugs and connectors used in connection with the channel.

The data link layer (i.e., "layer 2") is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the network.

The primary network layer protocol of the Internet architecture is the Internet protocol (IP) contained within the internetwork layer 116 (i.e., "layer 3"). IP is a network protocol that provides internetwork routing and that relies on transport protocols for end-to-end reliability. An example of such a transport protocol is the Transmission Control Protocol (TCP) contained within the transport layer 114. The term TCP/IP is commonly used to refer to the Internet architecture.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack is to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the internetwork layer encapsulates data presented to it by the transport layer within a packet having a network layer header. The network layer header contains, among other information, source and destination (logical) network addresses needed to complete the data transfer. The data link layer, in turn, encapsulates the packet in a frame that includes a data link layer header containing information required to complete the data link functions, such as (physical) MAC addresses. At the destination station 150, these encapsulated headers are stripped off one-by-one as the frame propagates up the layers of the stack 175 until it arrives at the receiving process.

A network switch logically separates the segments within a network and generally operates at layer 2 to transfer frames among entities of the network using MAC addresses. Typically, the switch is a computer comprising a plurality of ports that couple the switch to the other network entities over various types of network segments and media, such as Ethernet, fiber (FDDI) or token ring connections. A network entity may consist of any device that "sources" (i.e., transmits) or "sinks" (i.e., receives) frames over such media. A router, on the other hand, is typically a computer that connects different subnetworks and directs network traffic based on destination network layer addresses (layer 3) of the packets.

Switches and routers generally perform the same operation; namely, switching of data frames/packets. That is, switches use layer 2 switching to forward frames and routers use layer 3 switching to route packets. As noted, a difference between layer 2 and layer 3 switching involves the type of information inside the frame/packet that is used to determine the correct output port. Layer 2 switching generally comprises a "store-and-forward" operation in which a frame arrives on an input port of the switch from an input media and is forwarded to an output port for transmission over an output media. With layer 2 switching, frames are switched between ports based on MAC address information stored and maintained in a forwarding database (table) of the switch. With layer 3 switching, packets are "routed" based on network layer information.

Layer 2 switching generally prevents frames transferred between two ports from being forwarded to other ports of the switch. Restriction of extraneous traffic across switched port interfaces increases bandwidth over the network. Network performance can be further enhanced by limiting traffic through the use of virtual area local networks (VLANs). A VLAN is a logical group of end stations, independent of physical location, that restrains network traffic as a single broadcast domain. That is, only end stations defined within the VLAN receive a frame broadcast from the VLAN.

A trunk is a physical link between two switches (or between a switch and a router) that carries multiple logical links for VLANs. Traffic belonging to different VLANs may be multiplexed over the trunk using a protocol. An example of such a protocol is the Interswitch Link (ISL) protocol developed by Cisco Systems, Inc. of San Jose, Calif. Standard Ethernet, FDDI, or token ring frames, together with their associated VLAN information, are transmitted over a trunk, such as an ISL link, in accordance with the ISL protocol. The VLAN information is contained within a field of an ISL frame/packet that encapsulates the basic data frame. An example of an ISL encapsulation mechanism suitable for use with the present invention is described in U.S. Pat. No. 5,742,604, titled Interswitch Link Mechanism for Connecting High-Performance Network Switches, by Edsall et al., which patent is hereby incorporated by reference as though fully set forth herein.

The dynamic ISL (DISL) protocol is a protocol that dynamically configures trunk ports between ISL-capable switches. Broadly stated, DISL synchronizes the configuration of two interconnected port interfaces to be of the same type, either "non-trunk" (ISL non-configured) or "trunk" (ISL configured). Prior attempts to configure trunk ports required entry of command line interface (CLI) or simple network management protocol (SNMP) commands at both switches in order to set a port to trunk status. The DISL protocol generally obviates the need for such command entries as long as there is a point-to-point ISL connection between the two switches.

However, trunk ports of switches may be configured to support a plurality of trunk encapsulation types, such as IEEE 802.1Q and ISL. IEEE 802.1Q addresses the standardization of VLANs and associated protocols for controlling the propagation of multicast/broadcast traffic over VLANs. To that end, IEEE 802.1Q specifies details of a VLAN frame format used to carry VLAN IDs (VIDs), along with procedures for "tagging", modifying and "untagging" frames.

In the case of a switch that supports multiple trunk encapsulation types, a user must generally be aware of those trunk capabilities to ensure proper and reliable operation of the switch. For example, if the port at one end of a trunk is configured to a particular trunk encapsulation type, the port at the other end of the trunk must also be configured to that type; otherwise, there will be a loss of connectivity between the switches. As noted, a user typically manually configures the ports through the use of CLI/SNMP. Such an arrangement is inefficient and burdensome, and often creates problems for network management applications. The present invention is directed to alleviating such network management problems.

SUMMARY OF THE INVENTION

The present invention relates to a dynamic trunk protocol (DTP) that enables dynamic negotiation of trunk encapsulation types between ports connecting intermediate stations in a computer network. The stations are preferably switches interconnected by a trunking mechanism used to transport logical links for virtual local area networks (VLANs) between the ports. Negotiation between the ports results in synchronization of their configurations to a common trunk encapsulation type. In particular, the DTP synchronizes each trunk capable port to a common Interswitch Link (ISL), IEEE 802.1Q or non-trunk port configuration.

In accordance with the invention, the DTP manifests as a series of message exchanges between a local port and neighbor port over the trunking mechanism which includes a physical link and an associated protocol for maintaining VLAN associations of frames intact during transfer between the switches. Each message embodies a format that conveys novel configuration information representative of the status and type of interface circuitry of the port creating the message. The created message is then sent to the other port over the link and, if the configuration information differs, a negotiation process ensues between the ports that terminates with a mutually agreeable common configuration.

Advantageously, the invention reduces user intervention since only one end of the link (e.g., the local port) needs to be configured to initiate DTP negotiation. If the neighbor port fails to be of the same type of the local port during negotiation, DTP synchronizes the ports to a similar type by periodically advertising their status.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 5 is a diagram of Table 1 showing various combinations of trunk mode and encapsulation type of the local and neighbor ports after DTP negotiation in accordance with the invention;

FIG. 7 is a diagram of a DTP port state Table 2 depicting various current states of the ports with respect to events and actions;

FIG. 8 illustrates Table 3 which provides descriptions of the various DTP port states S1–S6;

FIG. 9 illustrates Table 4 which provides descriptions of the various DTP port state events E1–E12;

FIGS. 10A and 10B illustrate Table 5 which provides descriptions of the various DTP port state actions A0–A24;

FIG. 14 is a diagram of Table 6 showing information used to calculate status information for the ports in accordance with DTP negotiation;

FIG. 15 is a diagram of Table 7 showing information used to calculate status information for the ports in accordance with DTP negotiation;

FIG. 16 is a diagram of Table 8 showing information used to transition a port to a negotiating state in accordance with the invention; and FIG. 17 is a diagram of Table 9 showing information used to transition a port to a negotiating state in accordance with the present invention.

DETAILED DESCRIPTION OF AN ILLUSTRATIVE EMBODIMENT

Figure 1:
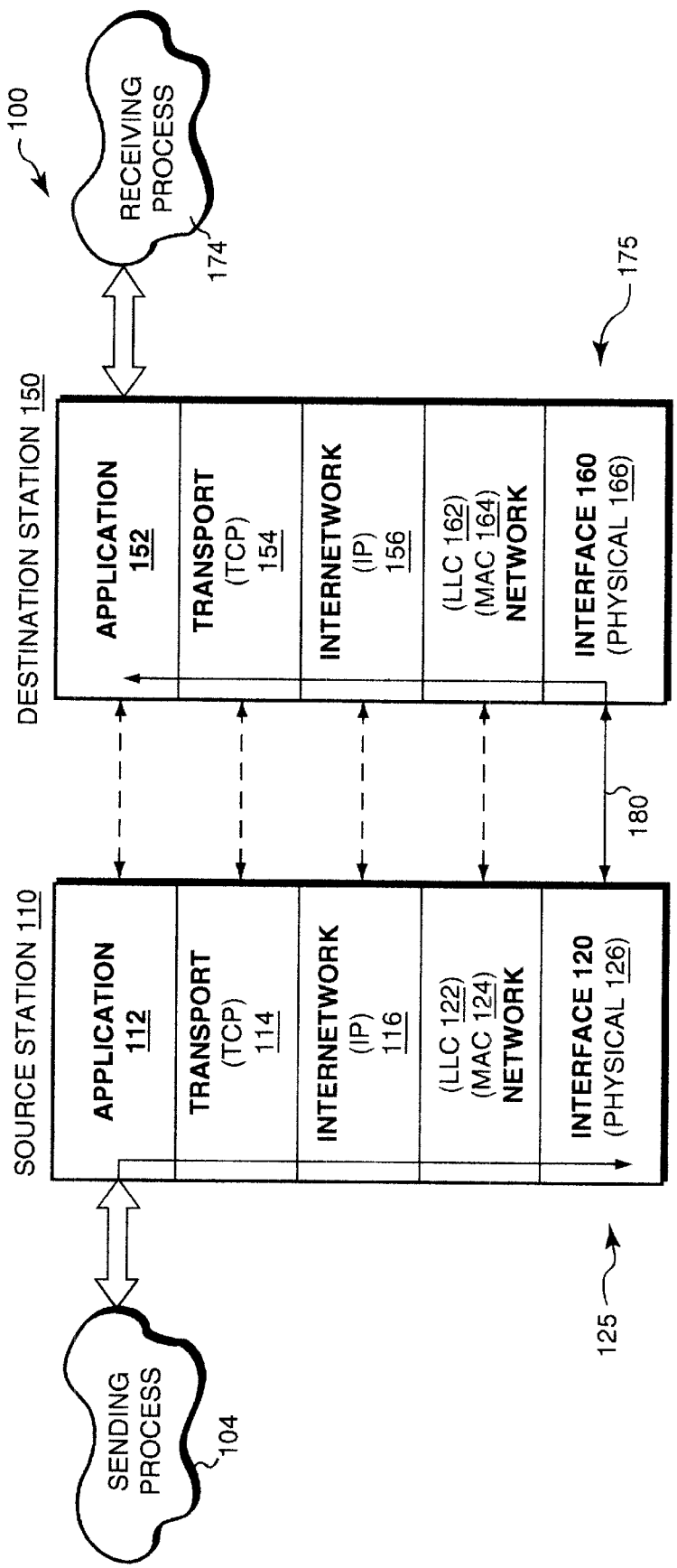
FIG. 1 is a schematic block diagram of prior art communications architecture protocol stacks used to transmit data between stations of a computer network.
Figure 2:
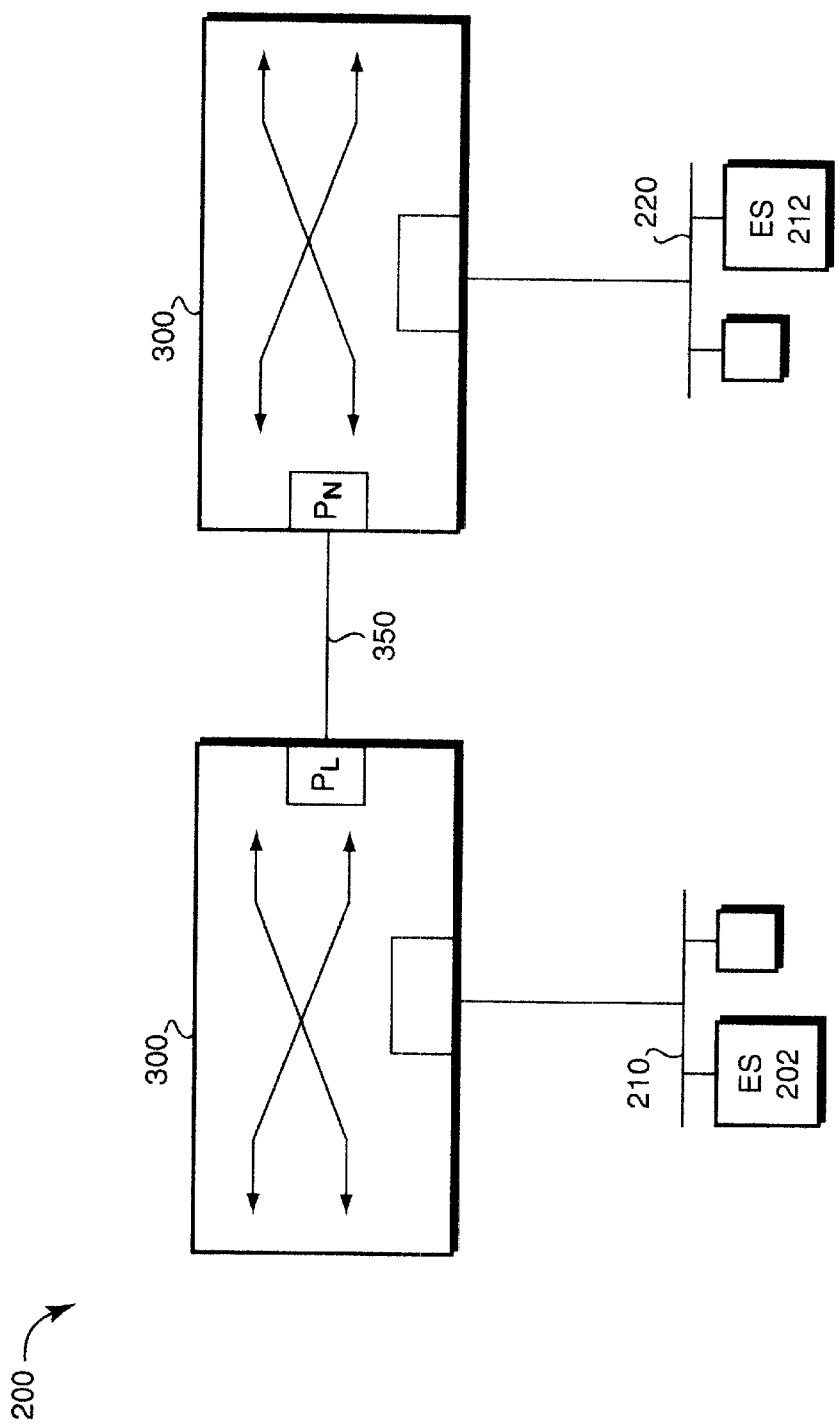
FIG. 2 is a block diagram of a computer internetwork comprising a collection of interconnected communication media and subnetworks attached to a plurality of stations.

FIG. 2 is a block diagram of a computer internetwork 200 comprising a collection of interconnected communication media and subnetworks attached to a plurality of stations. The stations are typically computers comprising end stations (ES) 202, 212 and intermediate stations 300. The end stations 202, 212 may include personal computers or workstations, whereas the intermediate stations 300 may be routers. However, in the illustrative embodiment described herein, the intermediate stations are preferably network switches.

Each station typically comprises a plurality of interconnected elements, such as a processor, a memory and a network adapter. The memory may comprise storage locations addressable by the processor and adapter for storing software programs and data structures associated with the inventive protocol. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the techniques described herein.

The subnetworks included within internetwork 200 preferably comprise local area network segments (LANs) 210 and 220, although the invention may work advantageously with other communication media. In the illustrative embodiment, the switches 300 are interconnected by a physical, trunk capable link 350 that interfaces to a local port $P_L$ and a neighbor port $P_N$. The link 350 may consist of any type of media (e.g., twisted-pair or fiber) functioning as a shared or point-to-point link. Communication among the stations of the internetwork is typically effected by exchanging discrete data frames or packets between the communicating nodes according to a predefined protocol. For the illustrative embodiment described herein, the predefined protocol is a dynamic trunk protocol (DTP) that runs at the data link layer, although the invention could be implemented with other protocols, such as the Internet protocol (IP), Internet Packet Exchange (IPX) protocol, AppleTalk protocol or DECNet protocol.

Figure 3:
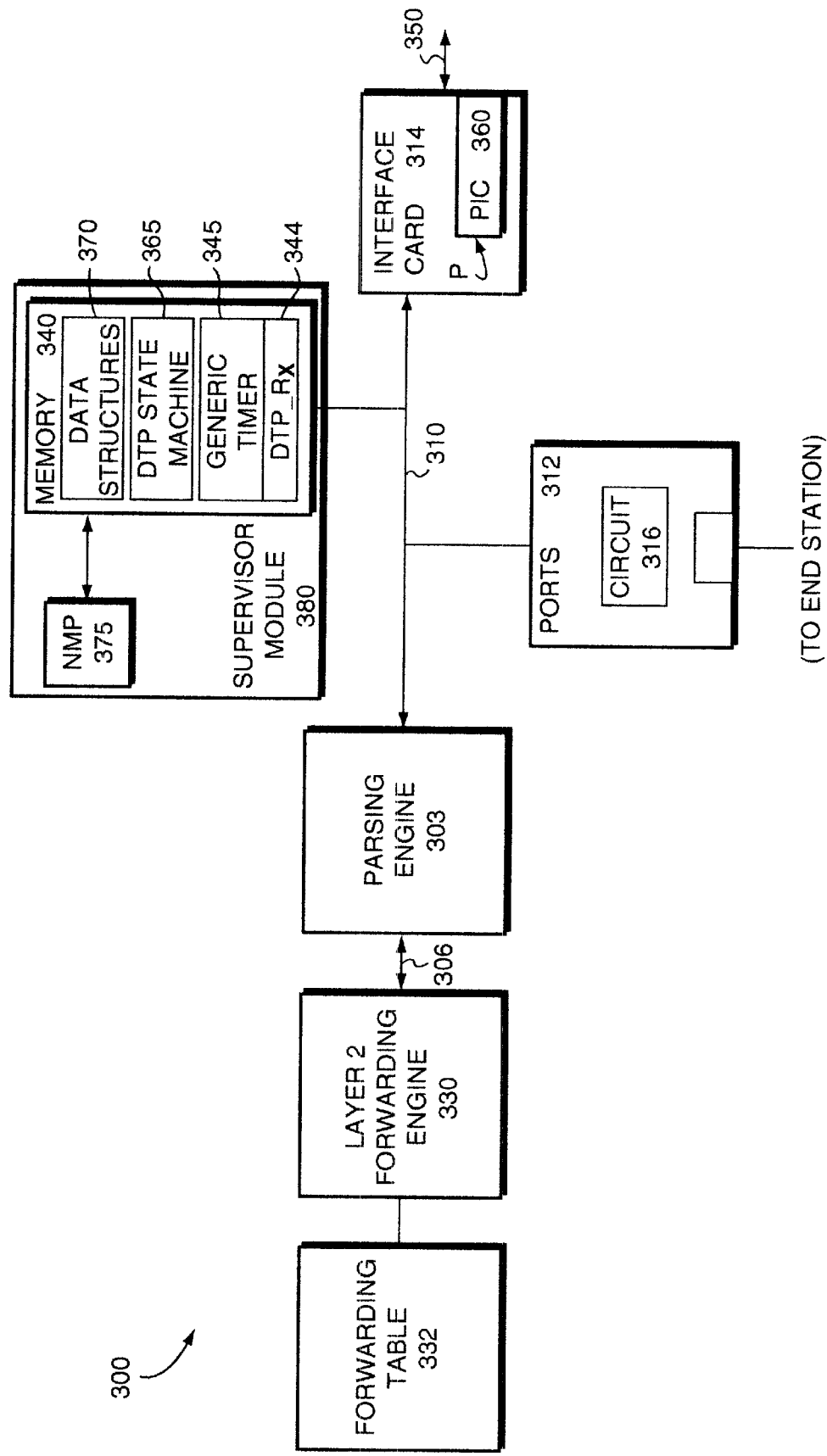
FIG. 3 is a schematic block diagram of a network switch configured to implement a novel dynamic trunk protocol (DTP) when connected to an intermediate station via a trunk capable link between local and neighbor ports.

FIG. 3 is a schematic block diagram of the network switch 300 which includes a layer 2 forwarding engine 330 configured to access and process information stored in forwarding database 332. The forwarding database is preferably organized as a centralized table structure used for learning and forwarding operations. The forwarding engine 330 determines actions to be taken on frames passing through the switch 300 and drives the results over a result bus 306. A parsing engine 303 receives the results from the result bus 306 and drives aggregate information onto a switching bus 310. The parsing engine 303 may further extract pertinent information from frames/packets traversing the switching bus 310 and transfer that information over the result bus 306.

Port card ("ports") 312 provides the circuitry needed to connect the switching bus 310 to the physical media of the network, whereas an interface card 314 provides port interface circuitry (PIC) 360 (for local port $P_L$) that enables coupling of the switch 300 to similar port interface circuitry (for neighbor port $P_N$) of a neighbor switch or router. As will be apparent from the description herein, port card 312 contains ports that are not trunk capable, whereas interface card 314 contains ports that are trunk capable. The switch 300 logically separates the LAN segments within internetwork 200 and generally operates at layer 2 to transfer frames among entities of the network based on media access control (MAC) addresses. Layer 2 switching also restricts extraneous traffic across switched port interfaces, thereby increasing bandwidth over the network. As noted, network performance may be further enhanced by limiting traffic through the use of virtual area local networks (VLANs).

Circuit 316 located on the port card 312 prefixes a VLAN value associated with the input port to an incoming frame. A VLAN value is generally assigned to each internal port of the switch and functions to further associate the port with a particular VLAN group. In the illustrative embodiment, the forwarding engine 330, the parsing engine 303 and the circuit 316 are each preferably implemented as a plurality of hardware registers and combinational logic configured to produce a sequential logic circuit, such as a state machine.

Each port of the switch may store and forward an incoming frame, i.e., the frame is stored while it is determined to which output port the frame is forwarded. The layer 2 forwarding engine 330 is generally a passive device with the exception that it sends a result over the result bus 306 indicating the output port(s) for the frame. The device also sends the VLAN value of the incoming frame over the result bus so that it can be used by the port P for transmission to the neighbor switch, as described further herein.

Multiple logical links for VLANs may be multiplexed over the link 350 (which may or may not function as a trunk link) using a trunking mechanism associated with a trunk encapsulation type, such as IEEE 802.1Q or Interswitch Link (ISL). Each trunk encapsulation type generally specifies a format for encapsulating a standard Ethernet, FDDI, or token ring frame within a VLAN-type frame used to carry VLAN information. In the case of a switch that supports multiple trunk encapsulation types, a user (operator) must generally be aware of those trunk capabilities and manually configure the local port $P_L$ to a type similar to that of a neighbor port $P_N$ in order to prevent loss of connectivity between the switches. Prior attempts to manually configure trunk ports have presented network management problems and the present invention is generally directed to a protocol capable for alleviating such problems.

Broadly stated, the present invention relates to a DTP protocol that enables dynamic negotiation of trunk encapsulation types between local and neighbor ports interconnecting switches in a computer network. The DTP protocol runs over the data link layer and is administered by a process (DTP_Rx 344) spawned on-the switch and stored on memory 340 of supervisor module 3 80. A generic timer process 345 is used to transmit periodic advertisements and to control timer events, whereas the DTP_Rx process 344 services incoming DTP advertisements and configuration change notifications, as described further herein. Negotiation between the local and neighbor ports results in synchronization of their configurations to a common trunk encapsulation type. The DTP protocol synchronizes each port P to a common ISL, IEEE 802.1Q or non-trunk port configuration through the use of various DTP port modes and states. These DTP port modes and states are contained in runtime port data structures 370 stored on the memory 340.

The supervisor module 380 further includes a network management processor (NMP) 375 and associated software to process and manage control packets such as the DTP advertisements. The control packets generally have special destination addresses (DA) associated with them; for example, the DA for DTP is 01-00-0C-CC-CC-CC. All packets received on a port and having this DA are forwarded to NMP 375 by the forwarding engine 330. The NMP "enqueues" the packets for servicing by the DTP_Rx process; DTP_Rx also services other enqueued messages in response to the occurrence of events, such as configuration changes (e.g., from auto to desirable, described below) and the expiry of timers.

DTP_Rx 344 further maintains DTP port state information (S1–S6) for each port in memory 340 and, as and when events (E1–E12) occur, performs appropriate actions (A0–A24), including changes to new state if necessary (see DTP port state Table 2 of FIG. 7). When the DTP port state for a particular port reaches state S6, its port hardware (e.g., PIC 360) is configured to the negotiated trunk type (e.g., ISL or 802.1Q). If the neighboring port does not agree to become trunk, that port remains non-trunk or its PIC 360 is configured to non-trunk if the port has been previously set to trunk. In this case, the port remains in state S2 (or S4 if the port is connected to a shared media and multiple neighbors are detected).

Figure 4:
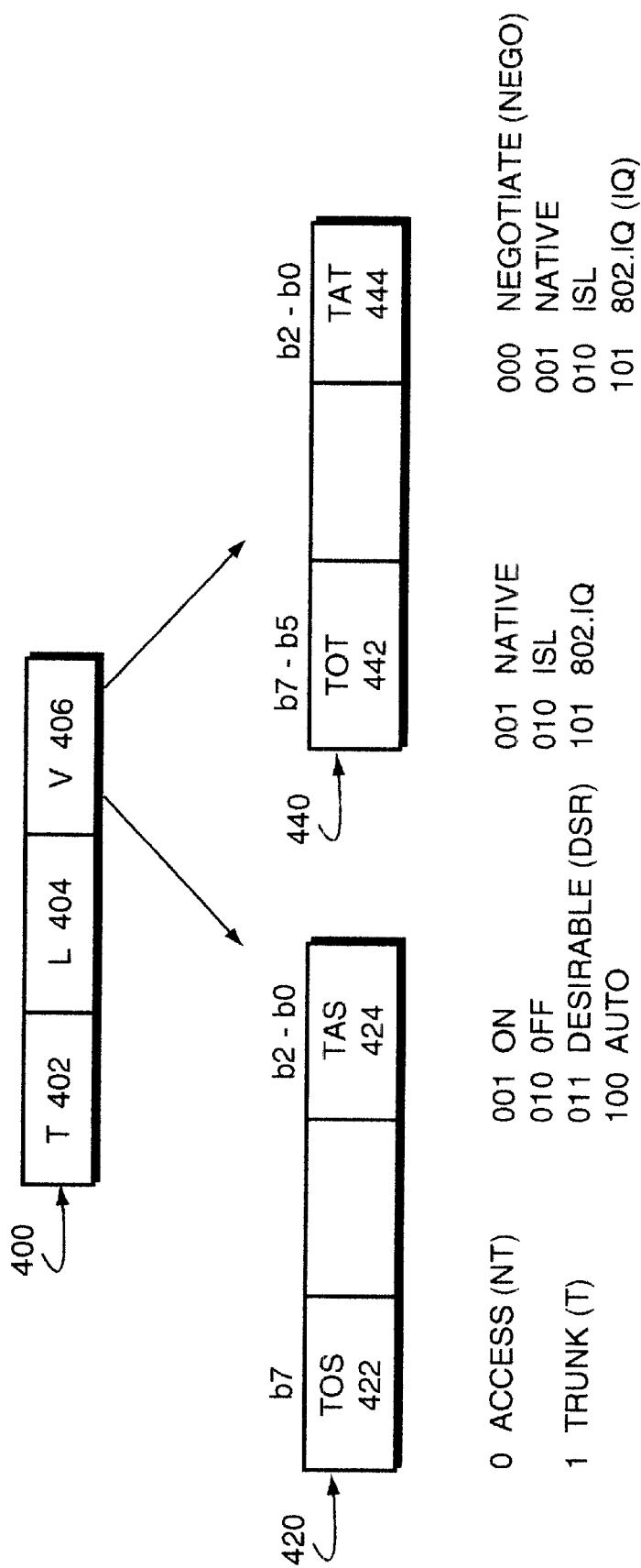
FIG. 4 is a schematic diagram of a format of a DTP packet that is exchanged over the trunk capable link in accordance with DTP negotiation of the present invention.

In accordance with the invention, the DTP manifests as a series of message exchanges over the trunk capable link 350. FIG. 4 is a schematic diagram of a message, i.e., a DTP packet 400, having a format that conveys novel status and type configuration information of each port. The DTP packet 400 preferably embodies a conventional type/length/value (TLV) format wherein the type (T) field 402 contents identify the type of information, the length (L) field 404 contents specify the length of the packet and the value (V) field 406 contains novel trunk status and type information.

For example, the value field 406 may contain trunk administration status (TAS) and trunk operational status (TOS) information having a format 420. The TAS subfield 424 is a 3-bit field whose contents specify the trunk administration status mode of port P. More specifically, each local and neighbor port P may be configured to a status mode of on; off; desirable; or auto. The on mode initiates DTP negotiation and forces the port P to a trunk port status even if negotiation with the neighbor fails, whereas offmode forces the port to non-trunk, access port status. The desirable mode also initiates negotiation, but only forces the port P to trunk status if the neighbor port agrees. In order to respond to such initiated negotiation and transition to trunk status if the neighbor agrees, the port P is placed in auto mode.

The TOS subfield 422 is a 1-bit field that normally specifies the present operational trunk status of the port P; an exception is when the port is in a DTP negotiation phase, at which point the subfield specifies trunk-status-to-be for the port. In the illustrative embodiment, the operational status is either access (NT) or trunk (T). PIC 360 of each port P is configured to operate initially as a non-trunk (i.e., access) port and, if the port fails to negotiate to a trunk status, it remains an access port.

The value field 406 may also contain trunk administration encapsulation type (TAT) and trunk operational encapsulation type (TOT) information having a format 440. The TAT subfield 444 is a 3-bit field whose contents specify the trunk administration encapsulation type of port P. When configured to a negotiate type, the port P may negotiate for ISL or 802.1Q encapsulation, whereas native type configures the port as a non-trunk, access port. All frames transmitted and received by the port are ISL-tagged when an ISL type is specified. ISL tagging occurs when the PIC 360 is configured in ISL mode. During negotiation the packets may or may not be tagged, depending upon the whether the PIC 360 is configured as trunk (state S5 or S6). If the PIC 360 is capable of transmitting untagged frames, a DTP packet may be sent untagged along with an advertisement. Similarly, all frames transmitted and received by the port are 802.1Q-tagged when an 802.1Q type is specified. The TOT subfield 442 is a 1-bit field that normally specifies the present operational encapsulation type (native, ISL or 802.1Q) of the port, except when the port is in DTP negotiation, at which point the subfield specifies trunk-status-to-be for the port.

In the illustrative embodiment, the default mode for DTP is auto for most switches although it may be desirable for some switches. If the local port's configuration $L_c$ and neighbor port's configuration $N_c$ are auto mode, they will not become trunk ports. To initiate DTP negotiation, one port's mode is changed to desirable (or, in some cases, on). The various combinations of trunk mode and encapsulation type of the local and neighbor ports, along with their final trunk type after DTP negotiation, are shown in Table 1 of FIG. 5.

Figure 6:
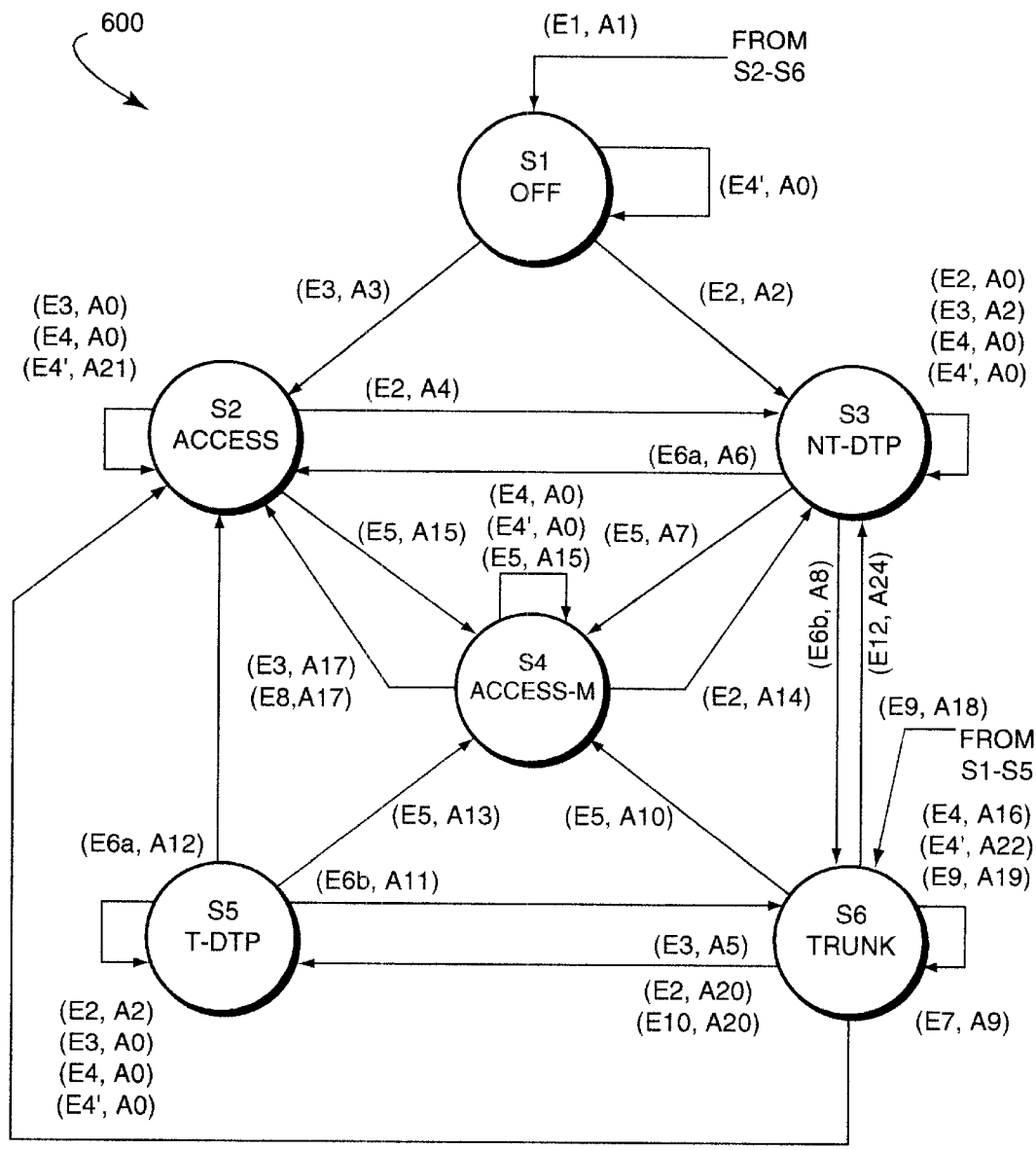
FIG. 6 is a schematic state diagram 600 illustrating operation of a DTP state machine according to the invention.

The supervisor module 380 includes a DTP state machine 365 (shown as resident in memory 340) that specifies the status of the port P. FIG. 6 is a schematic state diagram 600 which, in conjunction with Tables 2–5 (FIGS. 7–10), illustrate the operation of state machine 365. Specifically, Table 2 (FIG. 7) is a DTP port state table depicting various current states S1–S6 of the port P with respect to events E1–E12 and actions A0–A24; Table 3 (FIG. 8) provides descriptions of the various DTP port states S1–S6; Table 4 (FIG. 9) provides descriptions of the various DTP port state events E1–E12; and Table 5 (FIGS. 10A and 10B) provides descriptions of the various DTP port state actions A0–A24 (including an error action).

Note that the state machine 365 operates in accordance with a number of timers, including a hello timer $T_H$, a negotiation timer $T_N$, an access timer $T_A$ and a multidrop timer $T_M$. The interval for the hello timer $T_H$ is preferably 1 second during negotiation and 30 seconds when the port is in a conventional spanning tree protocol (STP) state (S2, S4 or S6). A DTP advertisement is sent out at the expiry of $T_H$. The interval for the negotiation timer $T_N$ is preferably 3 seconds, which is started when the port enters the DTP negotiation state (S3 or S5). If a received DTP packet changes the trunk status/type, $T_N$ is restarted with the derived configuration set in the DTP packet. At the expiry of $T_N$, the PIC 360 is configured as trunk or non-trunk (based on the derived TOS) and the port is added to STP.

The interval for the access timer $T_A$ is preferably ($10 \times T_H$), which is started when a port becomes trunk and participates in STP (state S6) for a desirable/auto mode. $T_A$ is reset whenever the port P receives a DTP packet that confirms its present state. When $T_A$ expires, the port P is configured as an access port. Similarly, the interval for the multidrop timer $T_M$ is preferably ($10 \times T_H$). Upon detecting multiple neighbors in trunk mode desirable/auto, port P is configured as an access port (state S4) and $T_M$ is started. This timer is reset whenever the port receives DTP packets from different neighbors. At the expiration of $T_M$, the port P transitions to state S2 and participates in negotiation. After 3 such expires, port P settles in state S4 as unable to become a trunk port without manual (e.g., operator) intervention.

When the link 350 is down, the port P is in access mode and when the link eventually comes up, the port is configured to block all traffic (except packets having a special destination address). When in on/desirable mode, the port transitions to NT-DTP negotiating state S3 with the TOS subfield 422 set to trunk (T) and access (NT), respectively. If the local port's configuration changes or a received DTP packet contains information that causes a change in trunk status of that port, the local port is removed from an STP state and transitions to DTP negotiating states S3 or S5. Note that the OnNoNegotiate mode is an option to DTP that may be overridden (i.e., not run), yet still enables configuration of the port to trunk status.

Figure 11:
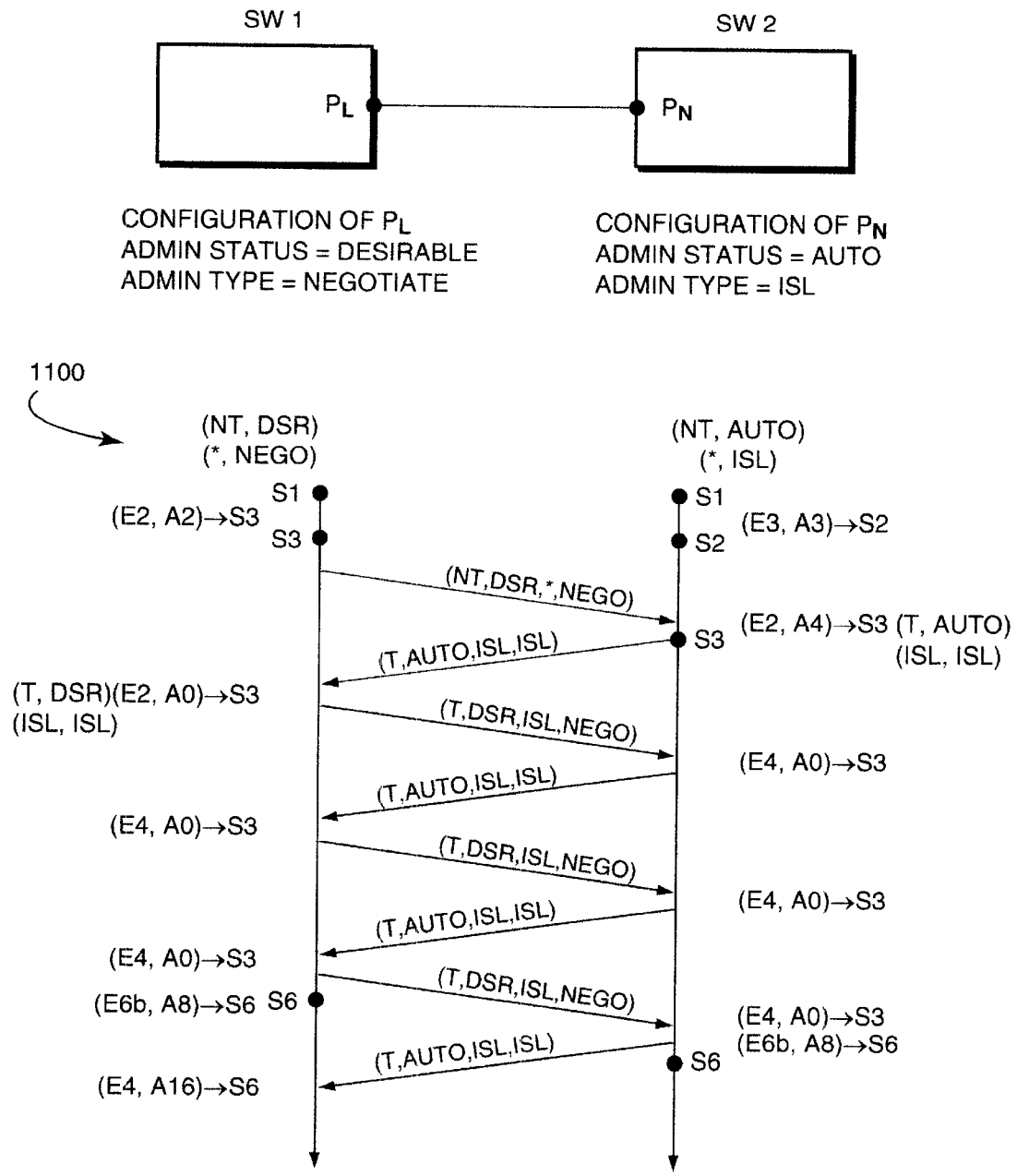
FIG. 11 is a schematic diagram of a DTP negotiation embodiment manifested as a series of message exchanges between a local port $P_L$ and a neighbor port $P_N$ of switches interconnected by a trunk capable link.
Figure 12:
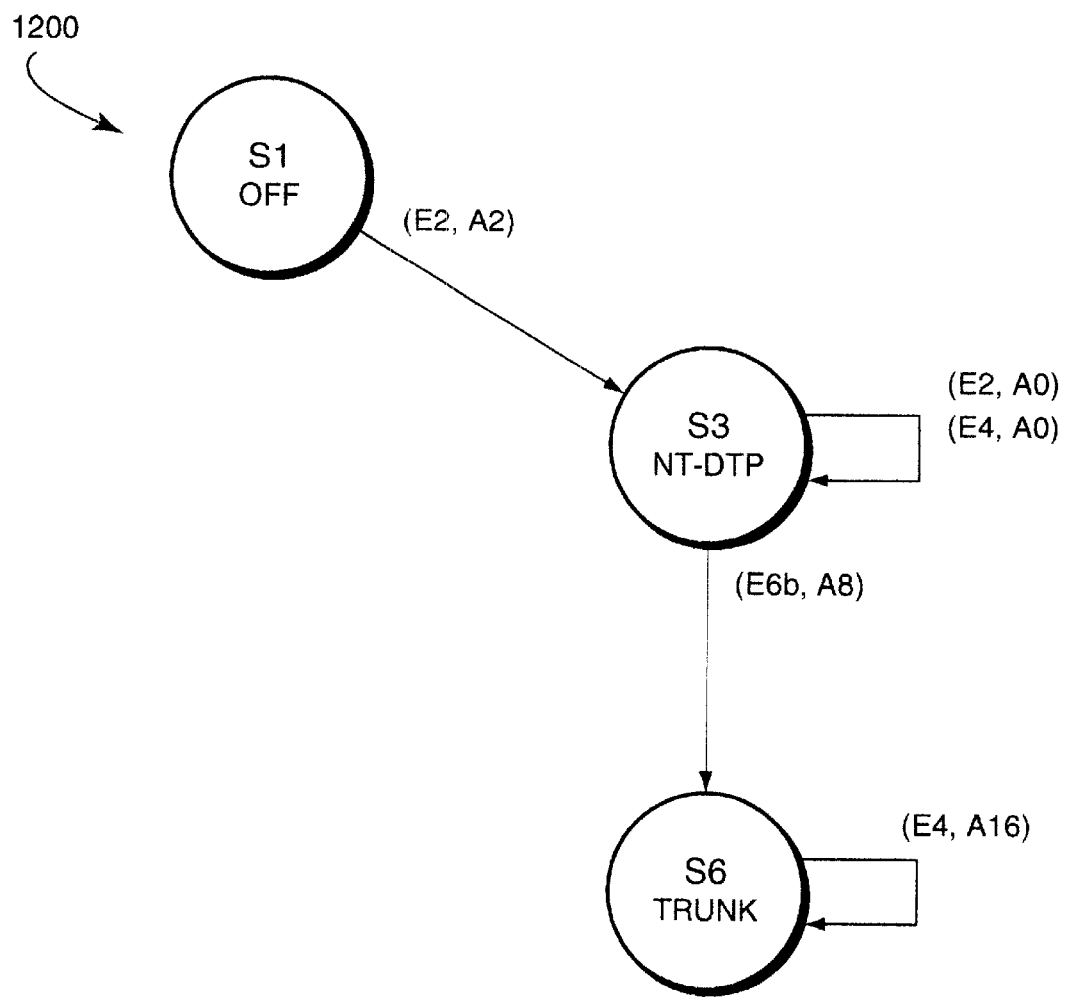
FIG. 12 is a state diagram showing the state transitions for local port $P_L$ as a result of the negotiation shown in FIG. 11.
Figure 13:
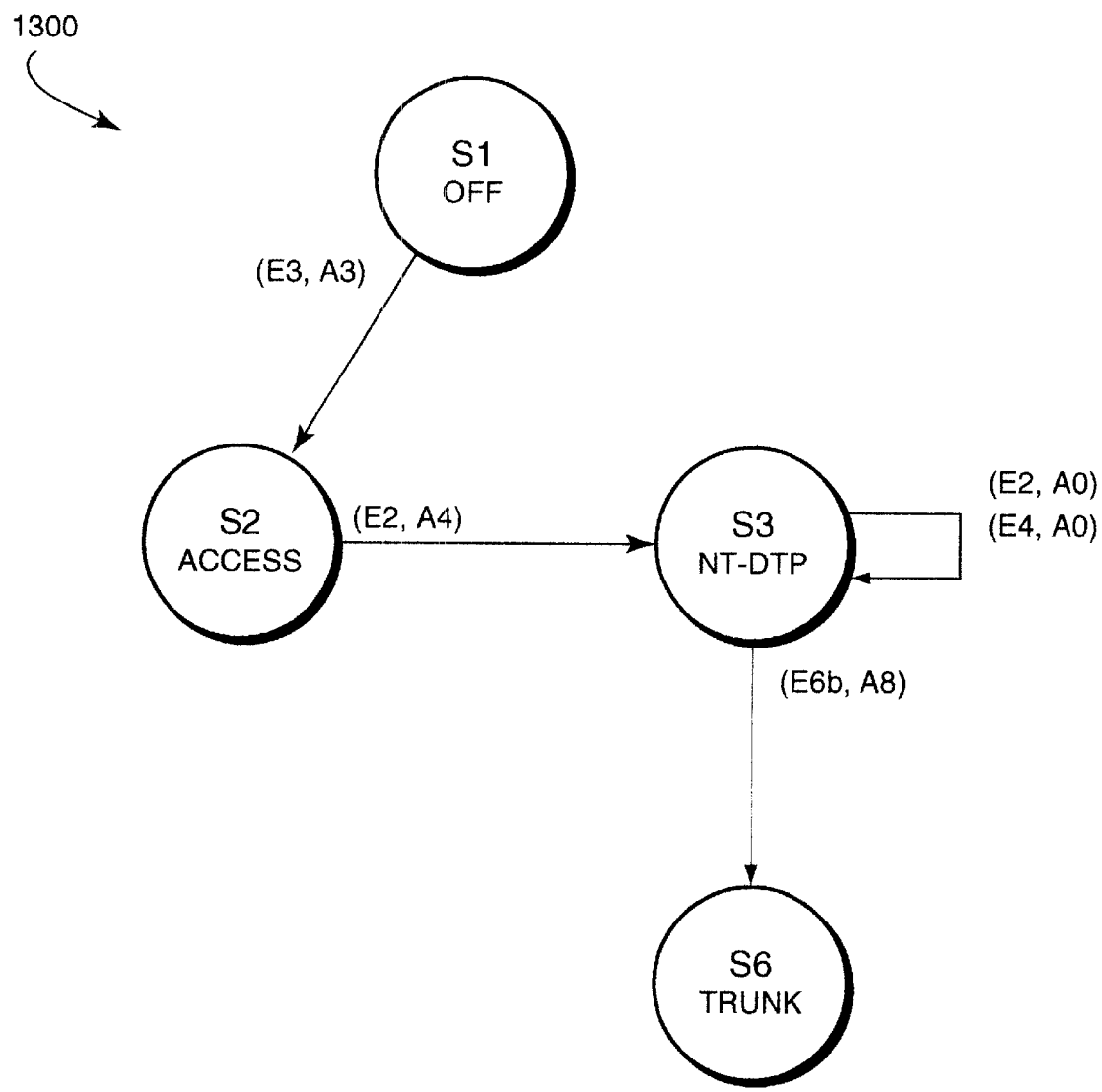
FIG. 13 is a state diagram showing the state transitions for neighbor port $P_N$ as a result of the negotiation shown in FIG. 11.

FIG. 11 is a schematic diagram of a DTP negotiation embodiment manifested as a series of message exchanges 1100 over link 1110 coupling switches SW1 and SW2. Here, local port $P_L$ on SW1 is configured with an administrative status (TAS) of desirable and an adminstrative type (TAT) of negotiate, whereas neighbor port $P_N$ on SW2 is configured with a TAS of auto and a TAT of ISL. When the link 1110 comes up, $P_L$ initiates negotiation. As a result of the exchange 1100, the ports P mutually agree to a trunk type of ISL and state S6 to become trunk ports. The state transitions for local port $P_L$ and neighbor port $P_N$ are shown in the state diagrams 1200 and 1300 of FIGS. 12 and 13, respectively.

Events E2–E4 are detected whenever a DTP packet 400 is received from neighbor port $P_N$ or when the local port's configuration $L_c$ changes. When a DTP packet is received from a neighbor port, the information contained in the packet ($N_{TOS}$, $N_{TAS}$, $N_{TOT}$ and $N_{TAT}$) is compared with the local port's configuration ($L_{TOS}$, $L_{TAS}$, $L_{TOT}$ and $L_{TAT}$) to determine if a change is required to ensure conforming trunk encapsulation types. New status ($D_{TOS}$ and $D_{TOT}$) is calculated in accordance with the information of Tables 6 and 7 shown in FIGS. 14 and 15. If a change is required, local port $P_L$ transitions to the DTP negotiating state, and $L_{TOS}$ and $L_{TOT}$ for the port are set to the derived (i.e., "agreeable") values.

Negotiation timer $T_N$ is then started to initiate transmission of DTP packets having the new derived status of the port. During this period, those DTP packets received at the local port that do not necessitate changes in the derived state are dropped. At the expiry of $T_N$, the port is configured to the finally derived (i.e., "mutually agreeable") state. Note that in states S2, S4 and S6, the current configuration reflects the configuration of the PIC. Note also that states S2, S4 and S6 are the "stable" states, and states S3 and S5 are the "negotiating" states. If packets are received that require further changes in the derived state, $T_N$ is restarted to initiate DTP packet transmission with the new derived status.

DTP packets are transmitted periodically through ports P having their modes set to on/desirable/auto. Periodic advertisements enable synchronization of the ports to a common trunk encapsulation type if the ports failed to receive the DTP packets exchanged during negotiation. In the illustrative embodiment, software encapsulated ISL packets are periodically transmitted to port P with status mode set to desirable/auto if the port cannot send/receive untagged native packets when configured as a trunk port. Upon receiving an ISL packet, the port decapsulates it and configures itself as an access port. DTP negotiation resumes once both local and neighbor ports are configured as access ports; this allows the ports to once again attempt configuration to a common trunk encapsulation type. If local port $P_L$ can send an untagged packet when configured as a trunk port, synchronization can be effected by exchanging untagged packets, since the neighbor port $P_N$ will understand the packet if configured as an access port and will configure itself to trunking status.

If local port $P_L$ is configured as a trunk port and its status mode is changed to off, a predetermined number (e.g., 3) of DTP packets are sent (at an interval of, e.g., 1 second) to quickly reconfigure the neighbor port $P_N$ to access status, after which the port will not participate in DTP negotiation. Also, if the trunk port operating in auto/desirable mode does not receive a DTP packet within another predetermined time (e.g., 5 minutes), the port is reconfigured to access status.

While there has been shown and described an illustrative embodiment for enabling dynamic negotiation of trunk encapsulation types between local and neighbor ports interconnecting switches in a computer network using a dynamic trunk protocol, it is to be understood that various other adaptations and modifications may be made within the spirit and scope of the invention. For example, the local port typically receives packets from the same neighbor and DTP negotiation settles quickly to a mutually agreeable port type. However, if the local port receives a DTP packet from a new neighbor and the trunk mode is auto/desirable, the local port is promptly configured to an access port and the multidrop timer $T_M$ is started. The port will remain an access port until $T_M$ expires. It should be noted, though, that $T_M$ is reset if a second neighbor is detected at the port. The port_id field (TLV) is used to identify different neighbors. Moreover if the local port's administrative types (trunk mode and/or encapsulation type) are changed, it may be necessary to change the port type and the port may transition to the negotiating state. The decision to transition to such a state is based on the information contained in Tables 8 (FIGS. 16) and 9 (FIG. 17).

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for dynamically negotiating trunk encapsulation types of trunk capable ports within intermediate stations interconnected by a link in a computer network, the apparatus comprising:
    a processor;
    a memory coupled to the processor, the memory storing a process that executes on the processor to administer a dynamic trunk protocol (DTP) for exchanging DTP messages between the intermediate stations, each DTP message containing trunk status and type information that enables dynamic negotiation of the trunk encapsulation types, the memory further storing and maintaining DTP port state information relating to the trunk and status type information; and
    port interface circuitry of each trunk capable port, the port interface circuitry coupled between the processor and the link to receive the DTP messages from the link and forward the messages to the processor for servicing by the process, the port interface circuitry responsive to the DTP port state information to thereby configure the trunk capable port in accordance with the negotiated trunk encapsulation type.

2. The apparatus of claim 1 wherein the processor is a network management processor and wherein the process is a DTP process.

3. The apparatus of claim 2 wherein each DTP message comprises a value field containing the trunk status and type information.

4. The apparatus of claim 3 wherein the value field comprises a trunk administration status subfield having contents that specify a plurality of status modes of the trunk capable port.

5. The apparatus of claim 4 wherein the plurality of status modes includes an on mode that initiates the dynamic negotiation and forces the trunk capable port to a trunk status.

6. The apparatus of claim 4 wherein the plurality of status modes includes an off mode that forces the trunk capable port to a non-trunk status.

7. The apparatus of claim 4 wherein the plurality of status modes includes a desirable mode that initiates the dynamic negotiation and forces the trunk capable port to a trunk status if a neighbor trunk capable port agrees.

8. The apparatus of claim 4 wherein the plurality of status modes includes an auto mode that responds to an initiated negotiation and transitions the trunk capable port to trunk status if a neighbor trunk capable port agrees.

9. The apparatus of claim 3 wherein the value field comprises a trunk operational status subfield having contents that specify a present operational trunk status of the trunk capable port.

10. The apparatus of claim 9 wherein the trunk operational status is one of non-trunk and trunk.

11. The apparatus of claim 3 wherein the value field comprises a trunk administration encapsulation type subfield having contents that specify a plurality of trunk administration encapsulation types of the trunk capable port.

12. The apparatus of claim 11 wherein the plurality of trunk administration encapsulation types includes a negotiate type that enables the trunk capable port to negotiate for one of an interswitch link (ISL) or IEEE 802.1Q encapsulation.

13. The apparatus of claim 11 wherein the plurality of trunk administration encapsulation types includes a native type that configures the trunk capable port as a non-trunk port.

14. The apparatus of claim 11 wherein the plurality of trunk administration encapsulation types includes an interswitch link (ISL) type that enables the port interface circuitry of the trunk capable port to transmit and receive ISL-tagged frames.

15. The apparatus of claim 11 wherein the plurality of trunk administration encapsulation types includes an 802.1Q type that enables the port interface circuitry of the trunk capable port to transmit and receive IEEE 802.1Q-tagged frames.

16. The apparatus of claim 3 wherein the value field comprises a trunk operational encapsulation type subfield having contents that specify a present operational encapsulation type status of the trunk capable port.

17. The apparatus of claim 16 wherein the trunk operational encapsulation type status is one of native, interswitch link (ISL) and IEEE 802.1Q.

18. The apparatus of claim 1 further comprising a DTP state machine for maintaining DTP port state information.

19. The apparatus of claim 1 wherein the link is a point-to-point link.

20. A method for dynamically negotiating trunk encapsulation types of a first port and a second port of respective first and second intermediate stations in a computer network, the stations interconnected via a link, the method comprising the steps of:
    transmitting a dynamic trunking protocol (DTP) packet from the first port over the link to the second port, the DTP packet containing configuration information representative of a status and type of first port interface circuitry of the first port;
    comparing the configuration information contained in the DTP packet with configuration information representative of a status and type of second port interface circuitry of the second port;
    if the compared information differs, forwarding a return DTP packet having configuration information representative of an agreeable status and type based on the configuration information contained in the first DTP packet;
    examining the returned agreeable status and type information at the first port; and
    if the returned agreeable status and type information is mutually agreeable to the ports, configuring the first and second port interface circuitry to the agreeable status and type.

21. The method of claim 20 wherein the configuration information includes a trunk status.

22. The method of claim 21 wherein the trunk status includes a trunk administration status.

23. The method of claim 21 wherein the trunk status includes a trunk operational status.

24. The method of claim 20 wherein the configuration information includes a trunk encapsulation type.

25. The method of claim 24 wherein the trunk encapsulation type includes a trunk administration encapsulation type.

26. The method of claim 24 wherein the trunk encapsulation type includes a trunk operational encapsulation type.

27. A method for dynamically negotiating trunk encapsulation types of a port at an intermediate station, the method comprising the steps of:
    transmitting a dynamic trunking protocol (DTP) packet from the intermediate station to a second intermediate station, the DTP packet containing configuration information representative of a status and type of port interface circuitry of the port;

receiving a return DTP packet from the second intermediate station, the return DTP packet containing configuration information representative of an agreeable status and type based on the configuration information contained in the first DTP packet;

examining the returned agreeable status and type information; and determining if the returned agreeable status and type information is mutually agreeable and if so, configuring the port interface circuitry to the agreeable status and type.

28. The method of claim 27 wherein the configuration information includes a trunk status.

29. The method of claim 27 wherein the configuration information includes a trunk encapsulation type.

30. A method for dynamically negotiating trunk encapsulation types of a first port at an intermediate station, the method comprising the steps of:

receiving a dynamic trunking protocol (DTP) packet from a second intermediate station, the DTP packet containing configuration information representative of a status and type of port interface circuitry of a second port;

comparing the configuration information contained in the DTP packet with configuration information representative of a status and type of port interface circuitry of the first port; and if the compared information differs, forwarding to the second intermediate station, a return DTP packet having configuration information representative of an agreeable status and type based on the configuration information contained in the first DTP packet.

31. The method of claim 30 wherein the configuration information includes a trunk status.

32. The method of claim 30 wherein the configuration information includes a trunk encapsulation type.

33. A computer network comprising a first port of a first intermediate station and a second port of a second intermediate station, the network comprising:

means for transmitting a dynamic trunking protocol (DTP) packet from the first port over the link to the second port, the DTP packet containing configuration information representative of a status and type of first port interface circuitry of the first port;

means for comparing the configuration information contained in the DTP packet with configuration information representative of a status and type of second port interface circuitry of the second port;

means for determining if the compared information differs and if so, forwarding a return DTP packet having configuration information representative of an agreeable status and type based on the configuration information contained in the first DTP packet;

means for examining the returned agreeable status and type information at the first port; and means for determining if the returned agreeable status and type information is mutually agreeable to the ports and if so, configuring the first and second port interface circuitry to the agreeable status and type.

34. The method of claim 33 wherein the configuration information includes a trunk status.

35. The method of claim 33 wherein the configuration information includes a trunk encapsulation type.

36. A computer readable media comprising:

the computer readable media containing computer executable instructions for execution in a processor for the practice of the method of claim 20 or claim 27 or claim 30.

37. An electromagnetic signal propagating on a computer network, the electromagnetic signal carrying information for executing on a computer the method of claim 20 or claim 27 or claim 30.

* * * * *